United States Patent [19]
Boughton

[11] B 3,914,012
[45] Oct. 21, 1975

[54] BINOCULAR BODY FOR MICROSCOPE PERMITTING VARIATION OF INTERPUPILARY DISTANCE WITHOUT COMPENSATING LENSES

[75] Inventor: Olin W. Boughton, Williamsville, N.Y.

[73] Assignee: American Optical Corporation, Southbridge, Mass.

[22] Filed: May 21, 1973

[21] Appl. No.: 362,589

[44] Published under the Trial Voluntary Protest Program on January 28, 1975 as document no. B 362,589.

[52] U.S. Cl. .................. 350/75; 350/10; 350/35
[51] Int. Cl.² .................. G02B 21/20; G02B 27/36
[58] Field of Search ............ 350/10, 35, 75, 76, 139

[56] References Cited
UNITED STATES PATENTS

| | | | |
|---|---|---|---|
| 983,569 | 2/1911 | Von Rohr | 350/35 X |
| 1,807,613 | 6/1931 | Bauersfeld et al. | 350/35 X |
| 1,965,755 | 7/1934 | Warmisham | 350/75 X |
| 3,434,772 | 3/1969 | Fogle | 350/35 |

FOREIGN PATENTS OR APPLICATIONS

| | | | |
|---|---|---|---|
| 941,874 | 4/1956 | Germany | 350/35 |
| 410,993 | 4/1910 | France | 350/75 |

Primary Examiner—David H. Rubin
Attorney, Agent, or Firm—Alan H. Spencer; William C. Nealon; H. R. Berkenstock, Jr.

[57] ABSTRACT

A binocular eyepiece for a microscope wherein variations in interpupilary distance may be accomodated by swinging the eyepiece tubes through in an arc about the optical axis of the instrument. This form of adjustment permits a widefield optical system to be unaffected by adjustment for interpupilary distance. A means to prevent rotation of at least one eyepiece when it is moved is also desirable to prevent rotation of reticles contained in the eyepiece and the corresponding loss of orientation.

5 Claims, 8 Drawing Figures

BINOCULAR BODY FOR MICROSCOPE PERMITTING VARIATION OF INTERPUPILARY DISTANCE WITHOUT COMPENSATING LENSES

BACKGROUND OF THE INVENTION

This invention relates to binocular microscopes. More particularly, this invention pertains to binocular microscopes adapted to accomodate individuals with wide interpupilary distance variations without restricting the field of view.

In a binocular type microscope that is utilizing two oculars or eyepieces, it is customary to provide some means for adjusting the interpupilary spacing between the eyepieces, such as may be required for accomodation to different uses to the microscopes. Conventional prior art systems, such as that taught in my U.S. PAT. NO. 3,309,161, must make some provision to simultaneously provide for refocusing of the eyepieces as their interpupilary system is changed or some other compensatory focusing adjustment must be achieved in the system if parfocality is to be maintained to avoid the necessity for refocusing. In order to automatically provide a compensating system, prior art instruments generally utilized a compensating lens mechanically coupled to the eyepieces so that the rear image plane of the microscope was moved into coincidence to the plane formed by both eyepieces. Such systems have the distinct disadvantage of significantly reducing the field of view through the eyepieces when the interpupilary distance is small or could not accomodate individuals having a small but not unusual interpupilary distance. Such systems are further distinguished by their mechanical complexity and large expense.

It is one object of the present invention to provide a binocular eyepiece adapted to accomodate individuals having a wide range of interpupilary distance.

It is further object of the present invention to provide a binocular eyepiece having accomodating variations in interpupilary distance with a constant field of view.

It is further object of the present invention to eliminate the necessity of a compensatory lens in a binocular microscope for accomodating individuals of varying interpupilary distance.

It is a still further object of the present invention to provide a binocular assembly for a microscope that accomodates different interpupilary distances by moving the eyepieces in arcuate paths about an optical axis without disturbing the orientation of a reticle in one of the eyepieces.

DETAILED DESCRIPTION OF THE INVENTION

Figure 1:
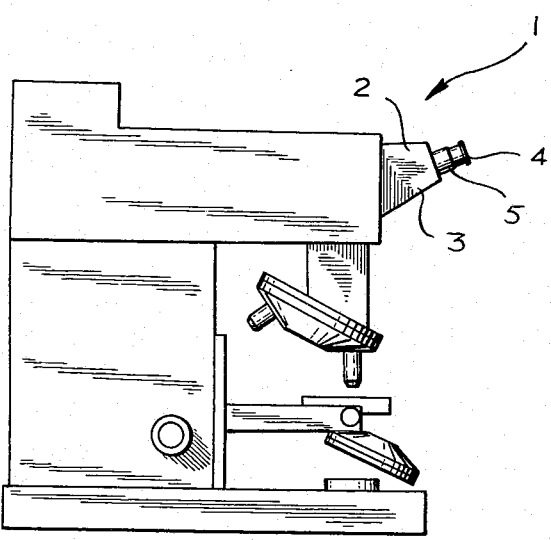
FIG. 1 is the side view of a microscope showing the binocular body position thereon.

Referring now to FIG. 1, a microscope is indicated generally by 1, carrying binocular body 2, which supports eyepiece tube holder 5 which is adapted to carry an eyepiece 4. Control knob 3 is used by the operator to adjust, by manual rotation, the interpupilary distance between the eyepieces.

Figure 6:
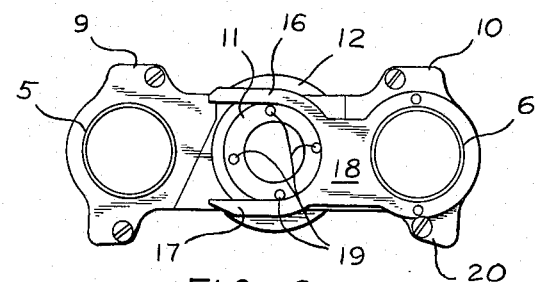
FIG. 6 is a top view of the binocular frame open to full extension.
Figure 7:
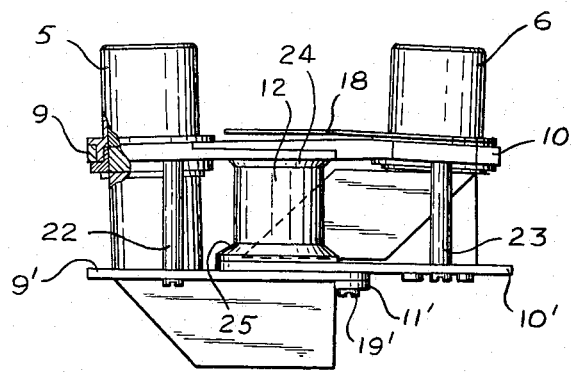
FIG. 7 is a front view of the fully extended binocular frame partly in section.
Figure 8:
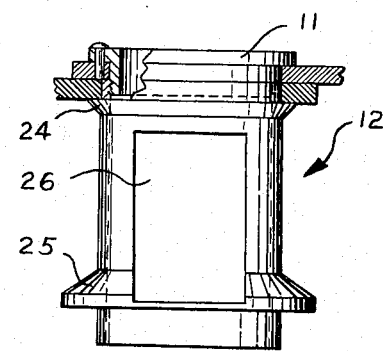
FIG. 8 is a side view of the pivot member.

Referring now to FIG. 6, 7 and 8, hollow support 12 has a pair of flanges 24 and 25 thereon. Support 12 acts as a pivot for pivotable eyepiece carrier 9. Retaining ring 11 is used to rigidly secure eyepiece carrier 10 to support 12 by means of crews 19, and position pivotable eyepiece carrier 9 against flange 24. Prism carrier 9' is pivotably mounted to support 12 by arm 10' and retaining ring 11' which are respectively secured to support 12 by screws 19' and seat prism carrier 9' against flange 25. Eyepiece tube 5 is mounted on pivotable carrier 9 and eyepiece tube 6 is mounted on eyepiece carrier 10. Eyepiece tube 6 is adapted for rotation about its optical axis to maintain orientation of coordinates in a plane perpendicular to the optical axis at any position within the arc of movement for accomodating various interpupilary distances. Orientation is provided by yoke 18 connected to pivotable eyepiece 6 and having fingers 16 and 17 in cooperative association with eyepiece tube 5. It is desirable to tilt the optical axis of the eyepieces and tubes 5 and 6 about 2° with respect to the center line of the instrument in order to improve operator vision comfort by parallax correction.

Figure 5:
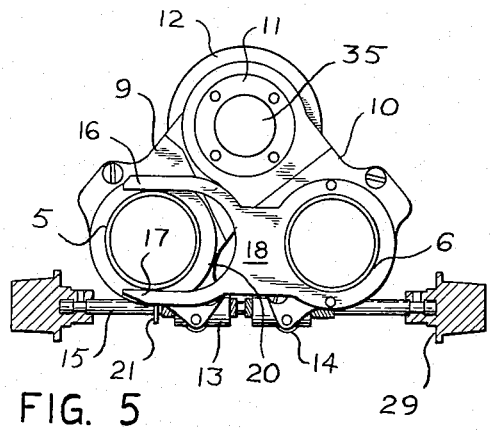
FIG. 5 is a top view of the binocular frame and adjustment mechanism.

Prism carrier 0' and arm 10' provide structural rigidity to assembly for smooth movement with good optical alignment by joining to the respective eyepiece carriers 9 and 10 through spacers 22 and 23. As shown in FIG. 5, an internally threaded member 13 is attached to pivotable eyepiece carrier 9 and a similar internally threaded member 14 is attached to eyepiece carrier 10. Internally threaded members 13 and 14 have reverse threads, i.e., one member has right-hand threads and one member has left-hand threads. A shaft 15 having externally threaded portions 27 and 28 is adapted to cooperate with internally threaded members 13 and 14 to cause members 13 and 14 to move toward each other when shaft 15 is rotated in one direction, and to cause the opposite motion when the shaft is rotated in the opposite direction. A stop 21 on shaft 15 prevents disengagement of the threaded portions of shaft 15 and the internally threaded members and also acts to define the range adjustment for maximum interpupilary distance. A stop for minimum interpupilary distance is provided by ear 20 which restricts reduction of interpupilary distance upon abutment with eyepiece tube 5. Knobs 3 are attached to each end of shaft 15 and have a bearing face 29 adapted to cooperate with a mating face 30 on body 2 to maintain a constant position of the binocular assembly within the body.

Figure 4:
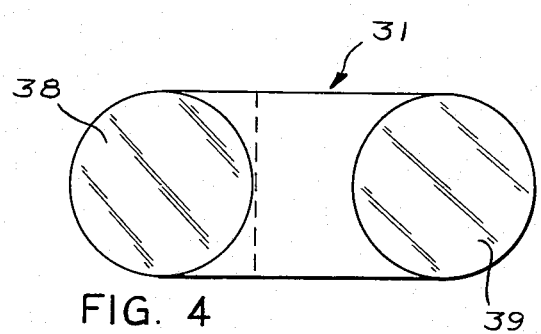
Fig. 4 is a top view of the beam splitter prism unit illustrating the cylindrical shape of the exit portions of the unit.
Figure 3:
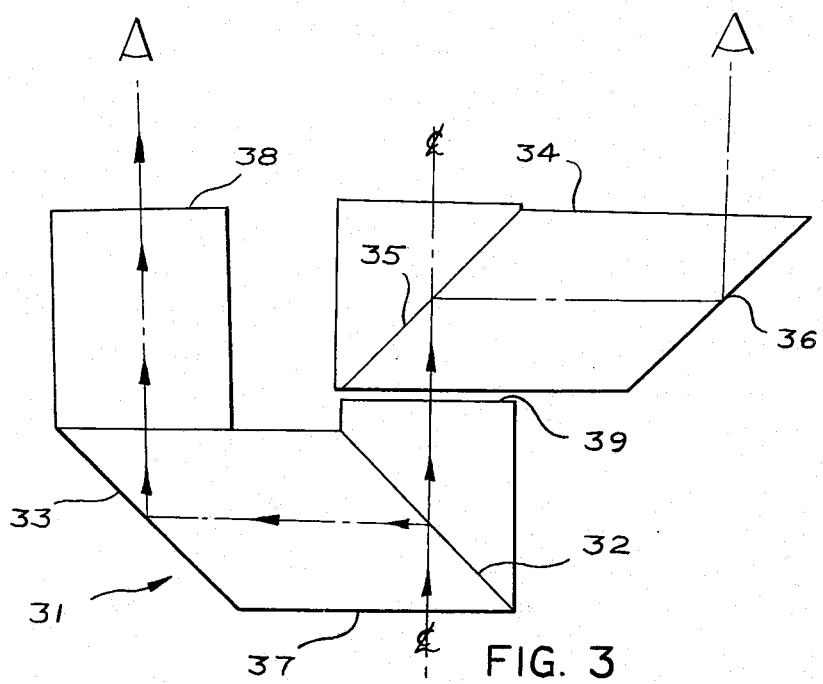
FIG. 3 is a diagramatic frontal view of the optical system for the binocular assembly.

Referring now to diagramatic FIG. 3, prism 31 has beam splitter 32 adapted to transmit 50% of the light received and reflect 50 % of such light. The reflected light is laterally displaced by prism 31 through beam splitter 32 and mirror 33. Prism 31 is supported by carrier 9'. FIG. 4 is a top view of prism 31 with the shape of exit faces 38 and 39 clearly shown. Prism 34 is adapted to displace the light transmitted through beam splitter 32 by mirrors 35 and 36. Prism 34 is attached to support 12 and extends through opening 26 along eyepiece carrier 10. The optical path through the prismatic system is shown by the arrowed lines and then passes through the eyepieces, not shown in this figure. The pivotable axis of the binocular assembly 36 is coincident with the optical axis of the light transmitted from face 37 of a prism 31 to mirror 35 in prism 34. Since variations of the interpupilary distance are produced by pivoting the eyepieces about a common axis which is coincident with the optical axis, the field of view is not reduced or enlarged as interpupilary distance is varied and a compensating lens is unnecessary since the overall length of the optical path does not change.

Figure 2:
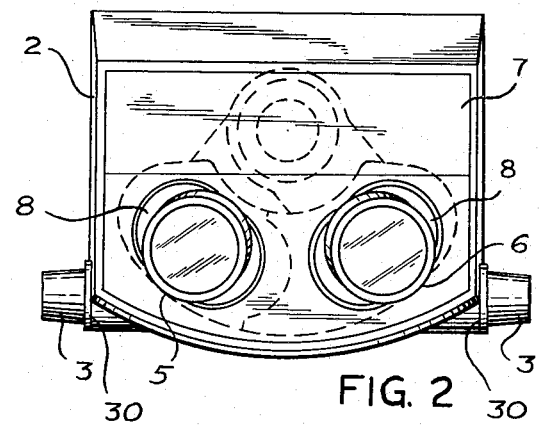
FIG. 2 is a top view of the binocular body.

In FIG. 2, binocular body 2 has opening 8 in face 7 permitting eyepieces 5 and 6 to extend therethrough. Opening 8 has a generally arcuate configuration to provide freedom of movement to adjust the eyepieces for different interpupilary distances. The optical and mechanical elements of the assembly are protected from dust and the like by conventional arrangements to insulate the interior of body 2 and effect sealing of opening 8.

What is claimed is:

1. In a microscope binocular assembly having a pair of members pivotable about a common axis and each carrying an eyepiece holder to provide accommodation for interpupilary distance, one eyepiece holder being mounted to rotate about its axis, the improvement comprising a rigid link fixed to said one eyepiece holder and slidably engaging the other eyepiece holder so that said one eyepiece holder will rotate during movement to accommodate interpupilary distance and maintain orientation of a reticle in an eyepiece held therein.

2. A binocular eyepiece assembly adapted to provide interpupilary adjustment for a microscope comprising, a frame including a first elongated eyepiece carrier having a pivot member fixed to one end thereof, said pivot member having a pivot axis extending transverse to the length of said first eyepiece carrier, a first eyepiece holder rotatably mounted on the other end of said first eyepiece holder and having an axis of rotation substantially parallel to said pivot axis, a second elongated eyepiece carrier pivotably mounted at one end to said pivot member to permit arcuate movement thereof, a second eyepiece holder mounted on the other end of said second eyepiece carrier, an internally threaded member connected to said other end of each eyepiece carrier, said threaded members being threaded in opposite directions, a manually rotatable shaft having externally threaded portions engaging said internally threaded members to vary the distance between said first and second eyepiece holders, first and second eyepieces carried by said first and second eyepiece holders respectively, a link rigidly mounted on the first eyepiece holder and extending toward said second eyepiece holder, said link slidably engaging said second eyepiece holder to prevent rotation of said first eyepiece holder relative to said second eyepiece holder so that a reticle in the first eyepiece has a consistent orientation to an image therein in any position of adjustment for interpupilary distance.

3. The binocular eyepiece assembly of claim 2 wherein said link has a pair of parallel fingers extending on opposite sides of said second eyepiece holder.

4. The binocular assembly of claim 2 wherein said frame further includes a first complimentary member, said first complimentary member being rigidly spaced from said first eyepiece carrier, one end of said first complimentary member being fixed to said pivot, and a second complimentary member being rigidly spaced from second eyepiece carrier and pivotably mounted at one end to said pivot member.

5. The binocular assembly of claim 4 further including a beam splitter and beam deflector mounted on one complimentary member and a pair of beam deflectors mounted on the other complimentary member so that light directed along an optical axis toward said beam splitter is presented to both eyepieces.

* * * * *